Nov. 9, 1948.　　　　　N. H. JURAN　　　　　2,453,134
PROJECTION INSTRUMENT FOR RECTIFYING
OBLIQUE PHOTOGRAPHS
Filed Dec. 27, 1945　　　　　　　　　　　　　　5 Sheets-Sheet 1
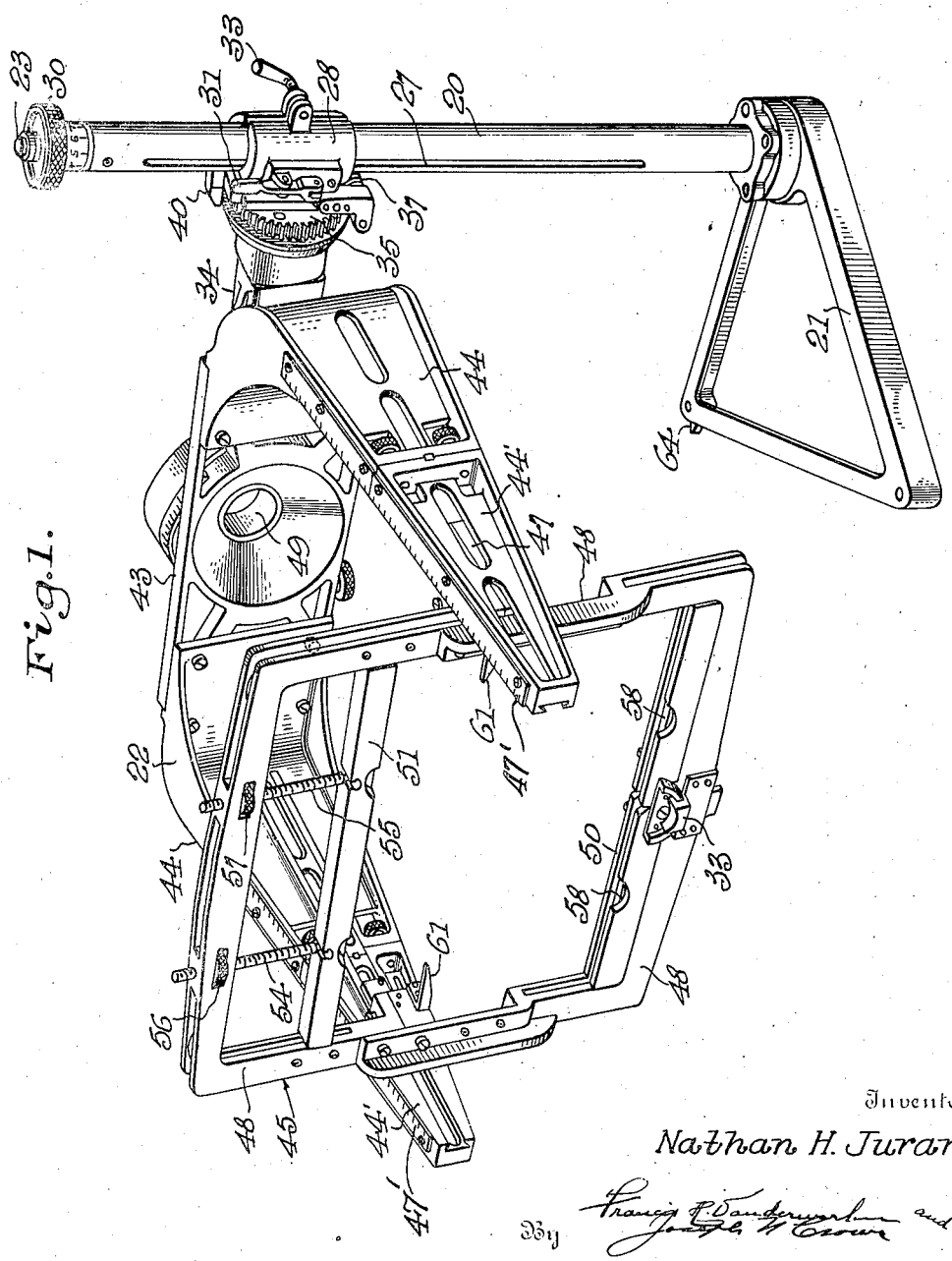
Inventor
Nathan H. Juran
By
Attorneys

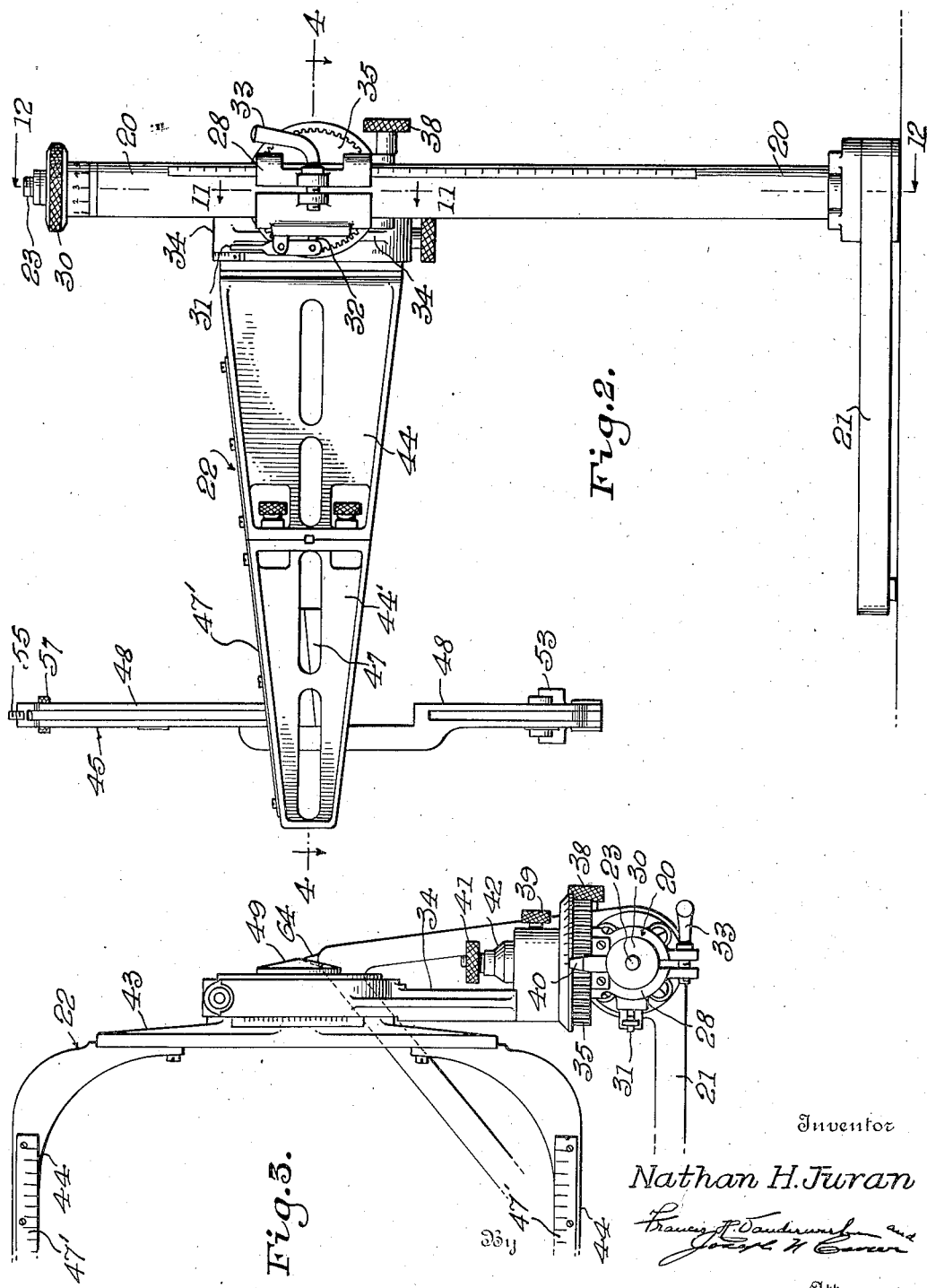

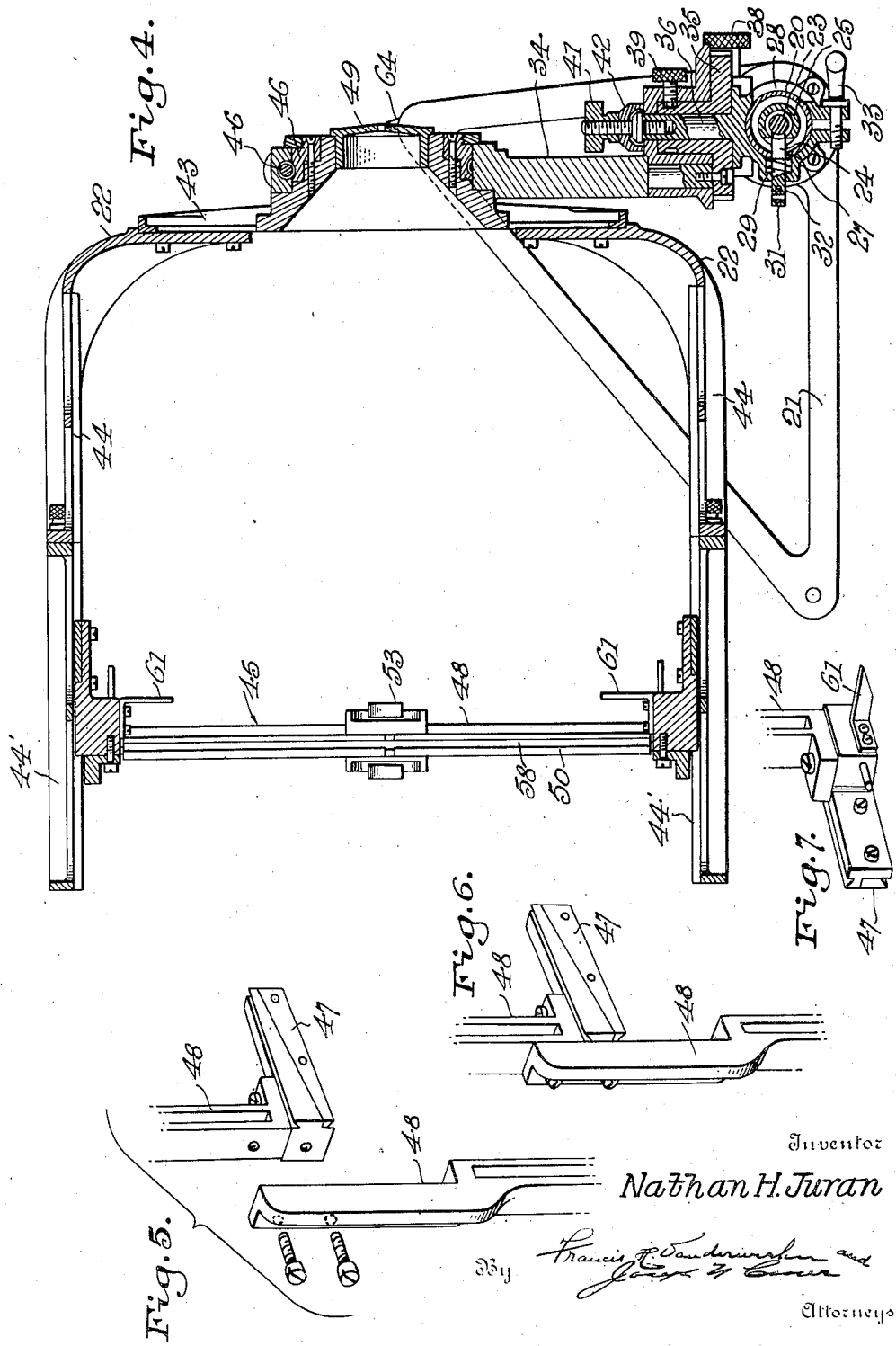

Nov. 9, 1948. N. H. JURAN 2,453,134
PROJECTION INSTRUMENT FOR RECTIFYING
OBLIQUE PHOTOGRAPHS
Filed Dec. 27, 1945 5 Sheets-Sheet 4
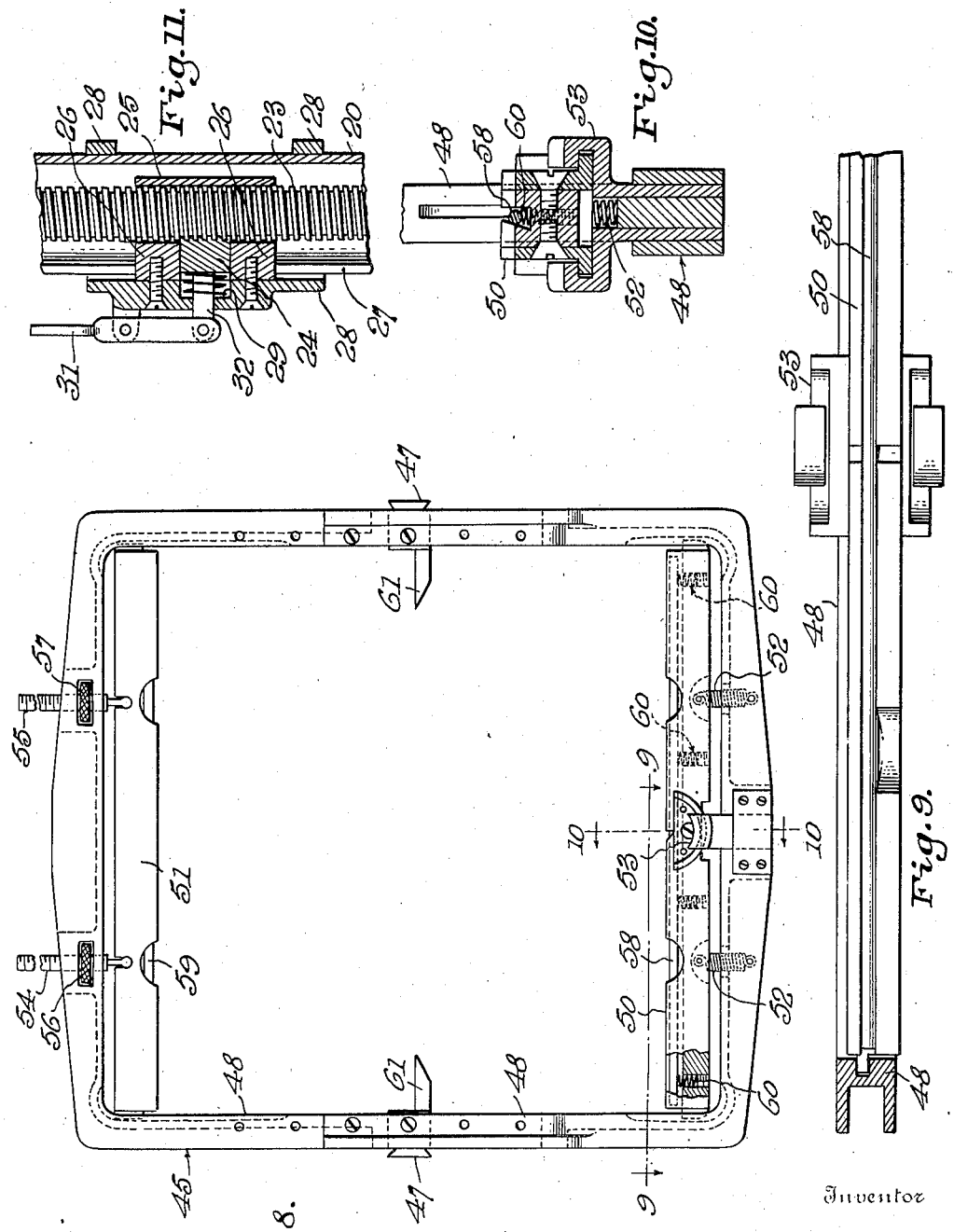
Inventor
Nathan H. Juran

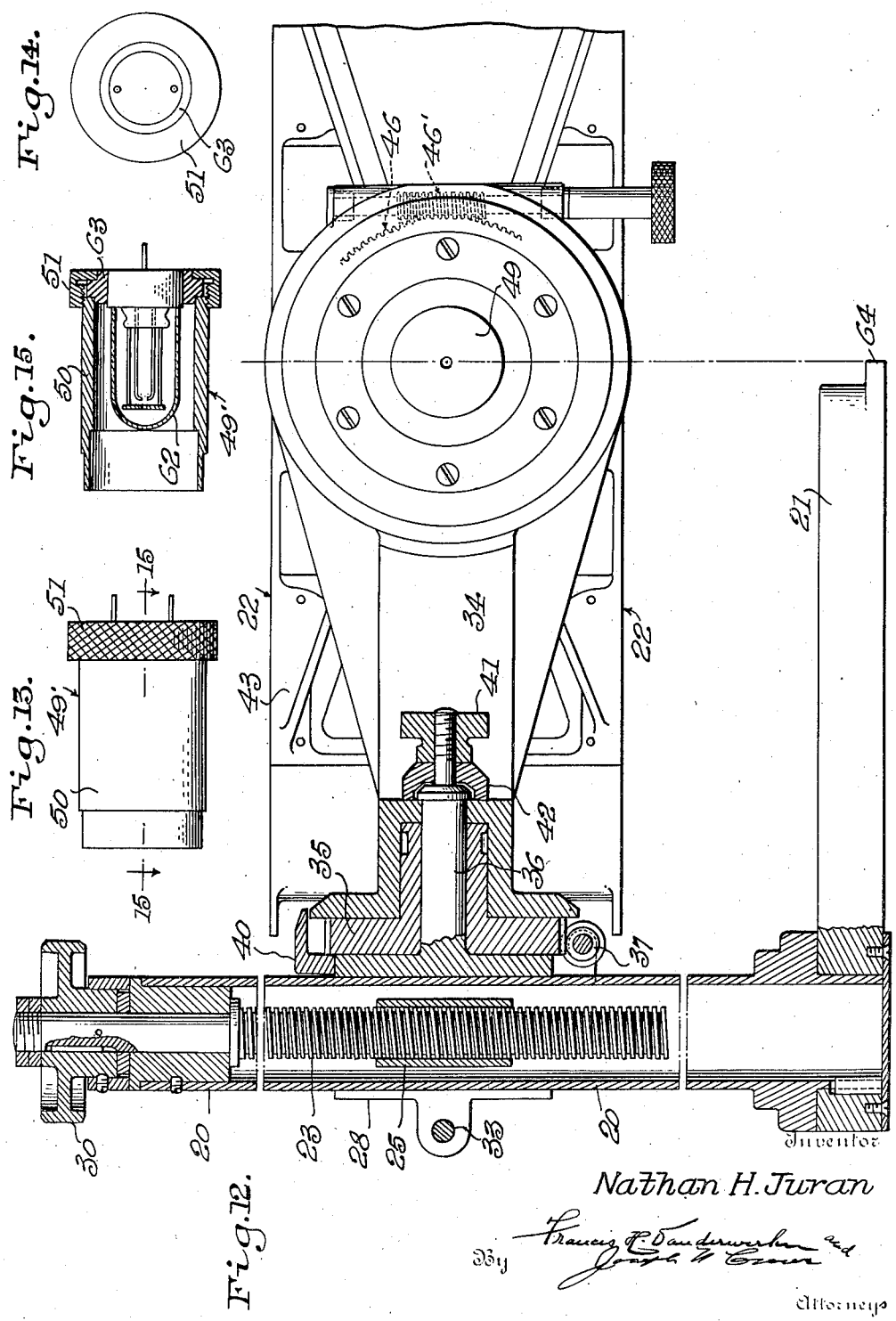

Patented Nov. 9, 1948

2,453,134

UNITED STATES PATENT OFFICE 2,453,134

PROJECTION INSTRUMENT FOR RECTIFYING OBLIQUE PHOTOGRAPHS

Nathan H. Juran, Manhattan Beach, Calif.

Application December 27, 1945, Serial No. 637,473

5 Claims. (Cl. 88—24)

(Granted under the act of March 3, 1883, as amended April 30, 1928; 370 O. G. 757)

The invention described herein may be manufactured and used by or for the Government for governmental purposes, without payment to me of any royalty thereon.

This invention relates to improvements in an instrument for rectifying oblique photos and more particularly to a photogrammetric projector and methods of using the same.

An object of this invention is to provide an instrument by means of which valuable information such as horizontal and vertical dimensions may be obtained from oblique photographs. Another object of the invention is to provide a comparatively inexpensive instrument for rectifying oblique photographs which is simple to operate. Another object of the invention is to provide methods of obtaining valuable information from oblique photographs by means of photogrammetric projection. Other objects and advantages of the invention will be apparent from the following description and the accompanying drawings in which:

Fig. 1 is a perspective view of an instrument embodying the invention;

Fig. 2 is a side elevation view of the instrument illustrated in Fig. 1;

Fig. 3 is a partial plan view of the instrument illustrated in Fig. 1;

Fig. 4 is a vertical section view taken along the line 4—4 of Fig. 2;

Figs. 5, 6 and 7 are perspective views of portions of a film holder;

Fig. 8 is a plan view in partial section of a film holder;

Fig. 9 is an interior view of a portion of the film holder illustrated in Fig. 8 in section along the line 9—9;

Fig. 10 is a section view taken along the line 10—10 of Fig. 8;

Fig. 11 is a section view taken along the line 11—11 of Fig. 2;

Fig. 12 is a rear view of the instrument illustrated in Fig. 2 in section along the line 12—12;

Fig. 13 is a side elevation view of an adapter and lamp for use in the instrument illustrated in Fig. 1;

Fig. 14 is an end view of the adapter illustrated in Fig. 13; and

Fig. 15 is a partial section taken along the line 15—15 of Fig. 13.

Referring to the drawings in detail there is a tubular upright support 20 secured to a base 21. The support 20 carries a projector 22 for projecting an oblique photograph onto a plane surface. The projector 22 is adjustable in height on the support 20 and may be tipped or tilted in the manner to be described hereinafter.

A rotatable, threaded shaft 23 is journalled in the upper end of tubular support 20 and extends downwardly into the support. A partially threaded member 24 carried by a sleeve 25 surrounding the shaft 23 engages with a threaded portion of the shaft 23. A pair of lugs 26 on the sleeve 25 project through an elongated opening or slot 27 in the tubular support 20 and are secured to a collar 28 slidably carried on the support 20.

The threaded portion of the member 24 is normally held in engagement with the threads on the shaft 23 by a spring 29 so that movement of the collar 28 up or down on the support 20 may be effected by turning a wheel 30 secured to the end of the shaft 23 projecting above the support 20. More rapid movement of the collar 28 relative to the support 20 is possible by disengaging the threaded member 24 from the shaft 23. For this purpose a lever 31 is connected to a plunger 32 which is in turn connected to the threaded member 24. When the lever 31 is pressed in, the threaded member 24 is withdrawn, against the force of the spring 29, from engagement with the shaft 24, thus permitting free movement of the collar 28 relative to the support 20. The collar 28 is split along one side and may be fixed in a selected position by tightening a clamping arm 33.

A supporting bracket 34 carrying the projector 22 is journalled on a neck portion of a gear 35 which is in turn journaled on a stub shaft 36 extending perpendicularly from the collar 28. A worm gear 37 supported from the collar 28 engages with the gear 35 and is operated by a knob 38. The bracket 34 is held in fixed relation to the gear 35 by a set screw 39 which extends through the bracket 34 and bears against the neck portion of the gear 35. Thus, the projector 22 may be rotated about a horizontal axis to the exact angle of tilt that the camera occupied relative to the earth when the photograph was taken. The projector 22 may also be moved independently of the gear train when the set screw 39 is loosened.

The angular relation of the projector 22 to the horizontal is indicated by a pointer 40 carried on the collar 28 and positioned relative to angular calibration markings on the bracket 34. When the projector 22 is located at the desired angle, it may be locked against further rotation by tightening a lock nut 41 engaging the end of the shaft 36 against a clamping member 42 which bears against the bracket 34.

The projector 22 includes a head portion 43 having a pair of spaced parallel arms 44 extending forwardly therefrom. The head portion 43 is rotatably mounted in the bracket 34 and carries a gear 46 engaging with a worm gear 46' mounted in the bracket 34. This worm gear 46' is operated by a knob and by turning the knob the projector may be tipped to compensate for conditions where the camera was not level when a photograph was taken. Rotation of the projector in this manner is about an axis perpendicular to the horizontal axis previously described.

The interesection of the two axes of rotation of the projector, as described above, coincides with the focal point in the optical system of the projector. The location of this focal point remains constant regardless of rotation of the projector about either of the two axes.

The head portion 43 of the projector has a central aperture to receive either a viewing diaphragm 49 having a pin-point aperture or an adapter 49' (illustrated in Figs. 13 to 15) for a pin point arc lamp 62. The diaphragm 49 and the adapter 49' are so constructed that the pin point aperture or the pin point arc of the arc lamp 62 will be located at the focal point of the projector. Generally speaking, it will be more convenient to project the photograph as may be done by using the adapter 49' and the pin-point arc lamp 62.

Various sources of illumination approximating a pin point such as the pin point arc lamp 62 are available commercially and when provided with an appropriate adapter may be used as the source of illumination. The particular lamp illustrated in Fig. 15 is known as a 10 watt concentrated arc lamp and it was developed under Contract No. OEMsr 984, a contract between the Office of Scientific Research and Development and the Western Union Telegraph Company. Inasmuch as the source of illumination, as such, constitutes no part of this invention it will not be described in detail herein.

The adapter 49' has a cylindrical body portion 50 to receive the arc lamp 62. A threaded cap 51 secured to the end of the body portion 50 bears against a ring 63 mounted on the base of the lamp 62 to hold the lamp in position in the adapter. The complete assembly fits into the central aperture in the head portion 43 in such a manner that the pin point arc of the lamp 62 is located at the focal point of the instrument.

The focal point of the projector at which the pin point aperture or source of illumination is located, corresponds to the nodal point of the camera lens with which the oblique photograph was taken and all lines of sight will converge at this point. When the pin point aperture is used it also provides a universal focus for the eye of a viewer enabling the viewer to focus upon the print and the projected image at the same time.

The arms 44 extending from the head portion 43 carry a film holder 45. If a print is the same size as the original negative, the film holder 45 is positioned on the arms 44 so that the central point of the photograph will be located at a focal distance from the focal point equal to the focal length of the camera with which the photograph was taken. When the size of the print differs from the original negative this focal distance may be calculated by the following formula:

$$\frac{\text{Focal Distance}}{\text{Focal Length of Camera}} = \frac{\text{Size of Print}}{\text{Size of Original Negative}}$$

When the holder 45 is positioned in accordance with the foregoing, the optical conditions which prevailed in the camera that took the original oblique photo are reproduced in the projector 22. Lens distortions are not corrected, however, and these distortions may result in a slight error in final movements.

In order to provide for various focal distances, extensions 44' are provided which may be attached to the arms 44 and secured thereto by thumb screws. The film holder 45 has a dovetailed shaped lug 47 on each side which engages with correspondingly shaped grooves in the arms 44 to permit a sliding movement of the film holder 45 relative to the arms. A scale 47' indicating the distance from the focal point is located on the upper edge of each of the arms 44 and the extensions 44' to facilitate locating the film holder at the desired position.

The film holder 45 is generally rectangular in shape consisting of two U-shaped members 48 bolted together. The U-shaped members have channelled portions to receive and guide the ends of stretcher bars 50 and 51 which hold the film. The lower stretcher bar 50 is resiliently held to the film holder 45 by springs 52 and additional guiding means 53 attached to the center of the stretcher bar 50 engages with an opening in the bottom of the lower member 49 of the film holder frame 45.

The upper stretcher bar 51 carries a pair of threaded rods 54 and 55 which engage with thumb nuts 56 and 57, respectively, carried by the upper member 48 of the film holder frame 45 so that the distance between stretcher bars may be adjusted for various sizes of prints. The stretcher bars 50 and 51 are slotted along their inner edges to receive the film. The film when inserted in such slots is resiliently held between rods 58 and 59 and the sides of the slotted portion of the stretcher bars. The slots in the stretcher bars 50 and 51 are so shaped that the rods 58 and 59 will not pass through the lengthwise openings of the slots against which they are forced by springs 60. When the film is inserted it is wedged between the rods 58 and 59 and the side walls of the slotted openings in the bars 50 and 51 and firmly held.

Collimation markers 61 are provided on the lower U-shaped member 48 to assist in proper alignment of the print in the film holder 45. In some instances it may be desirable to project the location of the focal point to a horizontal plane and for this purpose an indicator 64 is formed on the base 21 directly below the focal point of the instrument.

Operation of the instrument will now be described. When the instrument is set on a drawing table or board, the drawing table or board provides a horizontal plane approximating the earth's surface. In this connection it should be noted that it is desirable to select an oblique photo taken at an angle of not more than 55 degrees from the horizontal. The prime factor in operation is the orientation of the oblique photo to the drawing table. To accomplish this, various clues are used which must be found in the oblique photo. Examples of such clues are lines of position, geometric shapes, visible horizon, or orientation base, the use of which will now be discussed.

Lines of position, such as the vertical lines of smoke stacks, telegraph poles, or corners of buildings, are helpful clues. Horizontal lines, such as parapet lines, window sills, etc., are useful, especially where two horizontal lines of known angle are visible. Geometric shapes such as cylindrical oil tanks, rectangular gun emplacements, etc., are also useful in orientation. Visible sea horizons or land horizons of level country are very useful.

If the oblique is to be oriented with a map or vertical photo, it is necessary to have, in the oblique, an "orientation base." This consists of three or more points which can be identified both on the oblique and on the map or vertical photo. Generally, it is better to have these three points located at sea level, for instance, along a shoreline. A triangle drawn between the three points selected is known as the "orientation base." For best results, this base should cover as large an area of the oblique photograph as possible.

Where lines of position which have a known relationship to each other appear on the oblique photo, or when it is possible to construct such lines on the photo, they may be used to orient the projector in relation to the drawing table. This is done by drawing on the drawing board lines in their known relationship corresponding to the lines of position and adjusting the projector so that lines of position as projected by the instrument coincide with those on the drawing board.

For example, a rectangular building seen in perspective on an oblique photo provides three lines of position. The roof lines meeting at a corner are known to form a right angle in reality, and the corner of the building forms what is known to be a vertical line in reality. Thus there are three mutually perpendicular lines of position; transverse, longitudinal, and vertical. These can be reproduced on the drawing board by drawing a pair of perpendicular intersecting lines and by erecting a vertical line at their intersection.

There is only one location that the projector can occupy and where the projected lines of position of the photograph will coincide with corresponding lines of position constructed on the drawing board. This location places the projector in the same angular relation to the drawing board that the camera had to the terrain at the instant the original photo was taken. All lines of position must be made to coincide simultaneously or serious distortions will result.

Another example is where a photo contains an object known to be a perfect circle (an ellipse on the oblique photo). In this case a perfect circle is drawn on the drawing board, then the instrument is adjusted so that the projected image of the ellipse coincides with the perfect circle on the drawing board. When this coincidence is achieved, the instrument will be oriented with the proper tip and tilt. The orientation may be checked by seeing that the projection of any known vertical in the photo coincides with a true vertical line rising perpendicularly from the drawing board.

In using a horizon line on an oblique photo to orient the instrument to the drawing board, the instrument is placed on the drawing board so that a sight line from the focal point through the horizon line on the photo will be approximately parallel to the drawing board, and so that the subject matter as projected from the photo falls upon the drawing board. Since the horizon line on the photo is known to be at the same height above the earth as the camera lens (disregarding correction for curvature of the earth), it is possible to set up, on the drawing board, a false horizon line to represent the horizon line photographed in the picture. This is done by drawing a horizontal line on a piece of cardboard affixed to the drawing board at the opposite end from the instrument.

The horizontal line should be drawn on the cardboard at a distance above the drawing board equal to the distance of the focal point above the drawing board. With the focal point in fixed position, the projector is tipped so that the projection of the horizon line from the photo falls into coincidence with the false horizon line drawn above the drawing board. This orients the oblique photo to the drawing board. If the subject matter of the photograph does not fall on the drawing board when this is done, the instrument may be lowered without changing the adjusted tip and tilt, until the subject falls on the drawing board.

When very accurate work is required the curvature of the earth should be taken into consideration; to do this the distance from the drawing board to the false horizon instead of being made equal to the distance from the focal point to the drawing board, should be computed using the following formula:

$$D = H - d \tan 59\sqrt{h}$$

Where, $h$ = altitude of plane in feet.
$d$ = lateral distance of the focal point to the false horizon.
$D$ = vertical distance of drawing board to the false horizon.
$H$ = vertical distance of drawing board to the focal point.

Another method of orienting the instrument is by means of coordinating it with a map or vertical photograph. The map or vertical photograph is mounted on the drawing board and at least three points appearing in both the map or vertical photograph and the oblique photograph are selected as orientation points. These orientation points preferably are at the same elevation. In using inland points, the height of the point above sea level is required and it is necessary to erect a cross mark in space over the orientation points selected on the map. This can be done by erecting a vertical line on a card and marking the vertical position of the point on this line. Measurements of such vertical distances should be at the scale of the map.

As pointed out the various steps just described orient the instrument so that the projector is fixed at the same tip and tilt as the camera had relative to the earth at the instant the photograph was taken. This may be accomplished in other ways and the methods discussed are not to be understood as being exclusive.

After orienting the instrument to the drawing board, the operator is ready to project the information of the oblique photograph into its vertical and horizontal components, and to establish plans, elevations, measurements, etc. of objects and terrain shown.

As an example, where the deck plan and silhouette of a ship shown in an oblique photograph are desired, it is preferable to do the silhouette first. To accomplish this, the instrument is oriented to the drawing board so that the vertical and longitudinal axes on the photograph are oriented to a pair of perpendicular lines that have been drawn on the drawing board, while the transverse axis on the photograph falls on a line rising perpendicularly from the drawing board. The "centerline" outline of the ship may then be traced as it is projected on the drawing board. To obtain the deck plan, a similar set of three axes are developed on the drawing board, and the overall length of the ship, as determined by the silhouette, is projected onto the longitudinal axis. Then the transverse and longitudinal axes of the deck of the ship are oriented with the pair of perpendicular lines drawn on the drawing board, while the vertical axis on the photograph, as projected, falls on a line rising perpendicularly from the drawing board. The drawing board is now in the plane of the main deck of the ship (because the two horizontal lines of position are in this plane).

The deck plan (of the main deck only) may then be traced as it is projected on the drawing board. To trace any other deck plan above or below the main deck, it is necessary to lower or raise the projector vertically an amount equal to the distance between decks. This distance can be measured on the silhouette which has already been drawn. If the deck desired is above the main deck, the projector is lowered. If the deck desired is below the main deck, the projector is raised. Care should be taken not to disturb the tip and tilt of the projector in raising or lowering. Where the size of any object in the photograph is known, the size of any object in the photograph may be determined by using the projected size of the known object as a scale to measure the other objects.

Similarly, the instrument may be utilized to construct a complete ground plan or map of the area appearing in the photograph. After the instrument has been properly oriented, the projected image is simply traced on the drawing board.

When the instrument is used in conjunction with a map or vertical photograph, it is possible to determine the heights of any objects in the oblique photograph by using a vertical scale calibrated to the scale of the vertical photo or map. In the case of a constructed plan or map or a vertical photograph, it may be necessary to estimate this scale from objects of known size. With the instrument in its oriented position, the vertical scale is placed on the point (on the map or vertical photo) of which the elevation is desired. The height of the point in question can be read directly at the point where its projected image appears to intersect the vertical scale. By moving the vertical scale from one point to another on the vertical photo, the elevation of any point can be read.

While a preferred embodiment of the invention and methods of using the same have been shown and described herein, it will be apparent to those skilled in the art that various changes and alterations may be made in the details of construction and methods of using the invention without departing from the scope of the invention as defined by the appended claims.

I claim:

1. In an instrument for rectifying an oblique photograph, a projector, a film holder associated with the projector, said film holder being provided with slidable stretcher bars having screw operated adjusting means and adapted to retain various sizes of photographs within said film holder and said projector having an optical system having a pin point aperture located at its focal point, the focal point being located at a distance from the film holder in accordance with the focal length of a camera with which the oblique photograph was taken, means for rotating the projector about a horizontal axis and means for rotating the projector about a second axis perpendicular to the first mentioned axis, the intersection of the two axes coinciding with the focal point of the projector.

2. An instrument for rectifying oblique photographs, comprising a base, a vertical support extending from the base, a supporting bracket carried by the support, said bracket being adjustable vertically on the support and rotatable about a horizontal axis, and a projector carried by the supporting bracket, said projector including a film holder comprising a rectangular grooved frame provided with slidably mounted stretcher bars, said stretcher bars being adapted to retain photographs of various sizes within said frame and said projector being rotatable about an axis perpendicular to the above mentioned horizontal axis and having a focal point located at the intersection of the above mentioned axes of rotation.

3. An instrument for rectifying oblique photographs, comprising a base, a vertical support extending from the base, means for projecting the oblique photograph onto a horizontal plane, said projecting means including an optical system consisting of a viewing diaphragm having a pin point aperture, and parallel extensible arms supporting a film holder provided with adjustable stretcher bars adapted to hold various sizes of photographs, said film holder being positioned at a distance from said viewing diaphragm proportionate to the focal length of a camera with which the photograph was taken, the aperture in said viewing diaphragm being located at the focal point of said optical system, means for rotating the projecting means about a horizontal axis and means for rotating the projecting means about an axis perpendicular to said horizontal axis, said projecting means having its focal point located at the intersection of the above mentioned axis of rotation.

4. An instrument for rectifying oblique photographs, comprising a base, a vertical support extending from the base, means for projecting the oblique photograph onto a horizontal plane, said projecting means including an optical system consisting of a viewing diaphragm having a pin point aperture, and a film holder positioned at a distance from said viewing diaphragm proportionate to the focal length of a camera with which the photograph was taken, the aperture in said viewing diaphragm being located at the focal point of said optical system, a bracket adjustable vertically on the supporting member, said bracket being rotatable about a horizontal axis, the projector being carried by said bracket and being rotatable about an axis perpendicular to said horizontal axis with its focal point located at the intersection of said axes of rotation.

5. An instrument for rectifying oblique photographs, comprising a base, a supporting member carried by the base, means for projecting the oblique photograph onto a horizontal plane, said projecting means including a projector, an optical system operatively associated therewith and consisting of a viewing diaphragm having a pin point aperture, and a film mounting comprising a frame, stretcher bars contained within said frame and relatively adjustable therein, and film gripping means in connection with said stretcher bars, said film mounting being positioned at a distance from said viewing diaphragm proportionately to the focal length of the camera with which the photograph was taken, the aperture in said viewing diaphragm being located at the focal point of said optical system, a bracket adjustable on the supporting member, said bracket being rotatable about a horizontal axis, the projector being carried by said bracket and being rotatable about an axis perpendicular to said horizontal axis with its focal point located at the intersection of said axes of rotation.

NATHAN H. JURAN.

REFERENCES CITED

The following references are of record in the file of this patent:

UNITED STATES PATENTS

| Number | Name | Date |
| --- | --- | --- |
| 1,228,685 | Magowan | June 5, 1917 |
| 1,410,127 | Roussilhe | Mar. 21, 1922 |
| 1,911,142 | Cahill | May 23, 1933 |
| 1,955,116 | Duchatellier | Apr. 17, 1934 |
| 2,072,286 | Wellington | Mar. 2, 1937 |
| 2,079,090 | Von Gruber | May 4, 1937 |
| 2,261,201 | Wilson | Nov. 4, 1941 |